United States Patent Office 3,000,960
Patented Sept. 19, 1961

3,000,960
FORMALDEHYDE PRODUCTION
Edward N. Wheeler, Corpus Christi, and Lonnie S. Richardson, Pampa, Tex., assignors to Celanese Corporation of America, New York, N.Y., a corporation of Delaware
No Drawing. Filed Feb. 24, 1959, Ser. No. 794,868
8 Claims. (Cl. 260—606)

This invention relates to the production of substantially pure monomeric formaldehyde from a polymeric formaldehyde.

One useful method for generating monomeric formaldehyde is disclosed in U.S. Patent No. 2,460,592, February 1, 1949, of A. R. Miller, Jr. In this method a suspension of finely divided particles of a solid polymer of formaldehyde in a liquid carrier of low volatility is heated to depolymerize the polymer to form gaseous monomeric formaldehyde. When it is attempted to operate this process on a continuous basis it is found that undesirable solids are formed. These solids interfere seriously with the process, causing plugging of lines and adversely affecting the operation of the pumps used in the process. In addition the solids are of the type which occlude large amounts of the liquid carrier. The solids may be removed by filtration but this increases the cost of operation and also results in a loss of the portion of the liquid carrier which adheres to the filtered solids.

It is therefore an object of this invention to inhibit the formation of undesirable solids in the depolymerization of polymers of formaldehyde.

Other objects of this invention will be apparent from the following detailed description and claims. In this description and claims all proportions are by weight unless otherwise indicated.

According to one aspect of this invention, the production of formaldehyde in accordance with the aforesaid Miller patent is improved by the addition of an acid to the carrier liquids described in that patent. A particularly useful acid for this purpose is phosphoric acid. It is found that the addition of the acid results in a very great reduction in the amount of undesirable solids produced and also that any solids obtained are easily filtered and do not occlude large amounts of carrier.

Only a small amount of acid need be added. Thus, the proportion of acid may be less than about 5%, preferably less than 2%, for example in the range of about 0.02 to 0.5%, based on the weight of the carrier liquid.

As disclosed in the aforesaid Miller patent, the resulting monomeric formaldehyde is conducted to process through conduits which are heated (e.g. to about 175–200° C.) to prevent repolymerization.

The following example is given to illustrate this invention further.

*Example*

A cool 12–15% of slurry of powdered paraformaldehyde in a dioctyl phthalate (specifically di-2-ethylhexyl phthalate) containing 0.2% (based on the phthalate) of phosphoric acid was fed continuously to a heated reactor containing di-2-ethylhexyl phthalate and maintained at a temperature of 185° C. Formaldehyde gas was taken off overhead from the reactor. Dioctyl phthalate containing phosphoric acid was removed continuously from the reactor, cooled and then recycled by mixing it with powdered paraformaldehyde, in the concentration specified above. Only a very small amount of solids was formed, even after many weeks of operation. In contrast, when the phosphoric acid was omitted the rate of solids formation was many times higher and the nature of the solids was different, in that they occluded much higher proportions of the dioctyl phthalate.

While the invention has been illustrated using phosphoric acid, it will be understood that the other acids may be employed, such as sulfuric acid; acid sulfate esters, for example, alkyl hydrogen sulfates e.g. ethyl hydrogen sulfate; sulfonic acids, e.g. benzene sulfonic acid; and acidic phosphate esters, for example mono- or di-aryl hydrogen phosphates, e.g. tolyl dihydrogen phosphate or ditolyl hydrogen phosphate. The acid used should be stable at the depolymerization temperature of the polymer and should preferably be non-volatile and not yield volatile products at the temperature of the generating zone. Advantageously the ionization constant of the acid is above $1 \times 10^{-5}$. The acid should be uniformly dissolved or dispersed in the carrier liquid. For best results the acid should be non-corrosive; surprisingly it was found that the addition of phosphoric acid did not result in increased corrosion even at the elevated temperatures used.

The depolymerization may be effected at any suitable pressure. For example, atmospheric pressure or a subatmospheric pressure of 75 mm. Hg A. or below may be employed.

It is to be understood that the foregoing detailed description is merely given by way of illustration and that many variations may be made therein without departing from the spirit of our invention.

Having described our invention, what we desire to secure by Letters Patent is:

1. In the method of generating substantially pure monomeric formaldehyde from a polymer of formaldehyde which comprises metering said polymeric form into a heated generating zone as a suspension of finely divided particles in a liquid carrier having a vapor pressure of not exceeding 15 mm. Hg at 200° C., whereby the polymeric form is converted to formaldehyde and the liquid carrier remains substantially unchanged, the improvement which comprises inhibiting the formation of solids in said carrier by including in said carrier an acid which is stable at the temperature of heating and has an ionization constant above about $1 \times 10^{-5}$.

2. Process as set forth in claim 1 in which the acid is substantially non-volatile at the temperature of the heated generating zone, the proportion of acid being less than about 5% of the weight of said carrier and being sufficient to inhibit the formation of solids in said carrier.

3. Process as set forth in claim 1 in which the polymer of formaldehyde is paraformaldehyde and the acid is phosphoric acid.

4. Process as set forth in claim 1 in which the polymer of formaldehyde is paraformaldehyde and the acid is phosphoric acid in amount of about 0.02 to 2% of the weight of said carrier.

5. Process as set forth in claim 1 in which the carrier and acid are continuously withdrawn from the generating zone, then mixed with powdered paraformaldehyde and recycled to said generating zone.

6. Process as set forth in claim 1 in which the carrier is a dioctyl phthalate.

7. In the method of generating substantially pure formaldehyde from paraformaldehyde which comprises metering said paraformaldehyde into a generating zone heated to about 175–200° C. as a suspension of finely divided particles in di(2-ethyl hexyl) phthalate, whereby the paraformaldehyde is converted to formaldehyde and the liquid carrier remains substantially unchanged, and conducting the formaldehyde to process through conduits heated to about 175–200° C. to prevent repolymerization, the improvement which comprises including about 0.02 to 0.5% of phosphoric acid in said di(2-ethyl hexyl) phthalate withdrawing a blend of di-(2-ethylhexyl) phthalate and phosphoric acid from said generating zone and recycling said withdrawn blend by mixing said blend with powdered paraformaldehyde to form the slurry which is fed to said generating zone.

8. Process as set forth in claim 7 in which the concentration of phosphoric acid in the di-(2-ethylhexyl) phthalate is 0.2%.

References Cited in the file of this patent

UNITED STATES PATENTS 2,460,592     Miller  ------------------ Feb. 1, 1949